US012662218B2

(12) United States Patent
Serocki et al.

(10) Patent No.: US 12,662,218 B2
(45) Date of Patent: Jun. 23, 2026

(54) PIVOTABLE ACCESSORY MOUNT ASSEMBLY

(71) Applicant: TACO METALS, LLC, Miramar, FL (US)

(72) Inventors: Philip J. Serocki, Sparta, TN (US); Gary Cooper, Lebanon, TN (US); Daniel David, Cookeville, TN (US)

(73) Assignee: Taco Metals, LLC, Mirarmar, FL (US)

( * ) Notice: Subject to any disclaimer, the term of this patent is extended or adjusted under 35 U.S.C. 154(b) by 99 days.

(21) Appl. No.: 18/899,872

(22) Filed: Sep. 27, 2024

(65) Prior Publication Data

US 2025/0108889 A1 Apr. 3, 2025

Related U.S. Application Data

(60) Provisional application No. 63/585,985, filed on Sep. 28, 2023.

(51) Int. Cl.
| | |
|---|---|
| B63B 17/00 | (2006.01) |
| F16M 11/20 | (2006.01) |
| F16M 13/02 | (2006.01) |
| H01Q 1/08 | (2006.01) |

(52) U.S. Cl.
CPC ......... *B63B 17/00* (2013.01); *F16M 11/2007* (2013.01); *F16M 13/022* (2013.01); *H01Q 1/084* (2013.01)

(58) Field of Classification Search
CPC ............... B63B 17/00; F16M 11/2007; F16M 11/2021; F16M 13/022; H01Q 1/084; H02K 7/1166
USPC ...................................................... 248/276.1
See application file for complete search history.

(56) References Cited

U.S. PATENT DOCUMENTS

| | | | | |
|---|---|---|---|---|
| 8,875,347 B2 * | 11/2014 | Serocki | .................... | B60N 2/24 297/367 R |
| 9,249,827 B2 * | 2/2016 | Serocki | .................... | B60N 2/24 |
| 10,260,566 B2 * | 4/2019 | Salerno | ................. | F16C 41/004 |
| 11,814,139 B1 * | 11/2023 | Idema | .................... | F16M 13/02 |
| 2019/0335735 A1 * | 11/2019 | Serocki | ................. | A01K 97/10 |
| 2022/0071189 A1 * | 3/2022 | Serocki | ............... | F16M 13/022 |

* cited by examiner

*Primary Examiner* — Todd M Epps
(74) *Attorney, Agent, or Firm* — Price Heneveld LLP

(57) ABSTRACT

An accessory mount assembly includes a drive slide and a guide. The drive slide is connected to and linearly guided along the guide. A link is rotationally connected to the drive slide. A drive screw engages the drive slide to drive the drive slide. A mount is pivotably mounted and the mount is connected to the link to be pivoted by the link via a movement of the drive slide.

19 Claims, 14 Drawing Sheets

PIVOTABLE ACCESSORY MOUNT ASSEMBLY

CROSS REFERENCE TO RELATED APPLICATIONS

This application claims benefit of U.S. Provisional Patent Application No. 63/585,985 filed Sep. 28, 2023, titled Pivotable Accessory Mount Assembly, the disclosure of which is incorporated herein by reference in its entirety.

BACKGROUND OF THE INVENTION

Pivotable mount for raising and lowering accessories on a vessel.

a) Field of the Invention

This invention relates to the field of boats and accessory mounts that need to pivot to raise and lower accessories such as antennas.

b) Description of the Related Art

The present invention pertains to a drivable pivotable accessory mount for attaching to a T-top or roof of a boat, more specifically, to a pivotable accessory mount with a provision for attaching an antenna or anchor light so as to allow to lowering and raising of the antenna or anchor light. Normally pivotable mounts have a worm gear that drives a quadrant gear to raise and lower the antenna. An example of this construction can be found in U.S. Pat. No. 10,260,566 to Salerno for a Marine Antenna Actuator. This type of construction has the problem of gear backlash in any position except for full up and full down positions. Also, the travel speed is limited/slow during travel between the full up and full down positions.

SUMMARY OF THE INVENTION

The present invention is a pivotable mount to mount an accessory mount that is driven by a motor that is more versatile and easier to use and overcomes the disadvantages disclosed above. The mount includes a drive slide driven by a drive screw.

The screw driven link system eliminates the backlash in all positions and has triple the lifting power over the worm gear construction to allow lifting of heavy digital antennas. Also, the construction is mainly stainless instead of aluminum.

Additionally the operational travel speed is improved to 10 seconds from full up to full down versus 30 seconds for the worm gear construction.

With the foregoing and other objects in view there is provided, in accordance with the invention, an accessory mount assembly includes a drive slide and a guide. The drive slide is connected to and linearly guided along the guide. A link is rotationally connected to the drive slide. A drive screw engages the drive slide to drive the drive slide. A mount is pivotably mounted and the mount is connected to the link to be pivoted by the link via a movement of the drive slide.

In accordance with another feature of the invention, the guide has a tongue. The mount is pivotably mounted on the tongue. The drive slide has a first gap that receives the tongue to linearly guide the drive slide. The drive slide has a second gap to receive the link.

In accordance with a further feature of the invention, there is a motor with a drive shaft rotationally fixed to the drive screw to rotate the drive screw.

In accordance with an additional feature of the invention, the drive screw has a non-round opening and the drive shaft has a corresponding non-round profile to rotationally fix the drive shaft to the drive screw.

In accordance with yet another feature of the invention, the drive screw has a distal end opposite the drive shaft, the distal end has a support pin supported by the guide.

In accordance with another added feature of the invention, an end of the drive screw at the drive shaft has a reduced outer diameter that defines a neck and a seal ring engages the drive screw at the neck to seal against the drive screw.

In accordance with yet another additional feature of the invention, there is a housing for the drive slide, the drive screw, the link, and the guide. The housing has an opening for the drive screw to pass through. The seal ring is disposed in a counterbore at the opening.

In accordance with still another feature of the invention, a plate is affixed to the housing to retain the ring seal and to mount the motor.

In accordance with still yet another feature of the invention, a tube serves as a motor housing, the tube is connected to the housing to seal the motor from the elements.

In accordance with still a further feature of the invention, the drive slide has opposing side members spaced apart from one another by a crossmember. The side members each have a respective base end at a base plate of the guide. Each base end is elongated in a longitudinal direction of the drive screw to define respective extension portions.

In accordance with still yet a further feature of the invention, the bearing sleeves are disposed on the extension portions.

With the foregoing and other objects in view there is further provided, in accordance with the invention, an accessory mount assembly that has a guide with a tongue. A drive slide is linearly guided along the tongue. A link is rotationally connected to the drive slide. A drive screw engages the drive slide to drive the drive slide and a mount is pivotably mounted to the guide and connected to the link to be pivoted by the link via a movement of the drive slide.

In accordance with an added feature of the invention, the drive slide has opposing side members spaced apart from one another by a crossmember.

In accordance with another added feature of the invention, the side members each have a respective base end that rides on the guide. Each the base end being elongated in a longitudinal direction of the drive screw to define respective extension portions.

In accordance with still another added feature of the invention, bearing sleeves are disposed on the extension portions.

In accordance with still another added feature of the invention, there is a motor with a drive shaft fixed to the drive screw to rotate the drive screw. The drive screw has a non-round opening and the drive shaft has a corresponding non-round profile to rotationally fix the drive shaft to the drive screw.

With the foregoing and other objects in view there is additionally provided, in accordance with the invention, an accessory mount assembly to pivot an accessory that has a guide with a tongue. A drive slide is defined by two side members connected and spaced apart by a crossmember that defines a first and second gap between the side members.

The first gap receives the tongue to linearly guide the drive slide. The second gap receives a pivoting link to pivot the accessory.

In accordance with an added feature of the invention, a drive screw engages the drive slide to drive the drive slide along the tongue. A mount is pivotably mounted to the link to be pivoted by the link via a movement of the drive slide.

In accordance with another feature of the invention, a motor with a drive shaft is rotationally fixed to the drive screw to rotate the drive screw. The drive screw has a non-round opening and the drive shaft has a corresponding non-round profile to rotationally fix the drive shaft to the drive screw.

Although the invention is illustrated and described herein as embodied in the mount assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The embodiments of the invention are illustrated by way of example, and not by way of limitation, in the figures of the accompanying drawings in which like reference numerals refer to similar elements. In the drawings.

DETAILED DESCRIPTION

In the following description, numerous specific details are set forth. However, it is understood that embodiments of the invention may be practiced without these specific details. In other instances, well-known structures and techniques have not been shown in detail in order not to obscure the understanding of this description.

Figure 1:
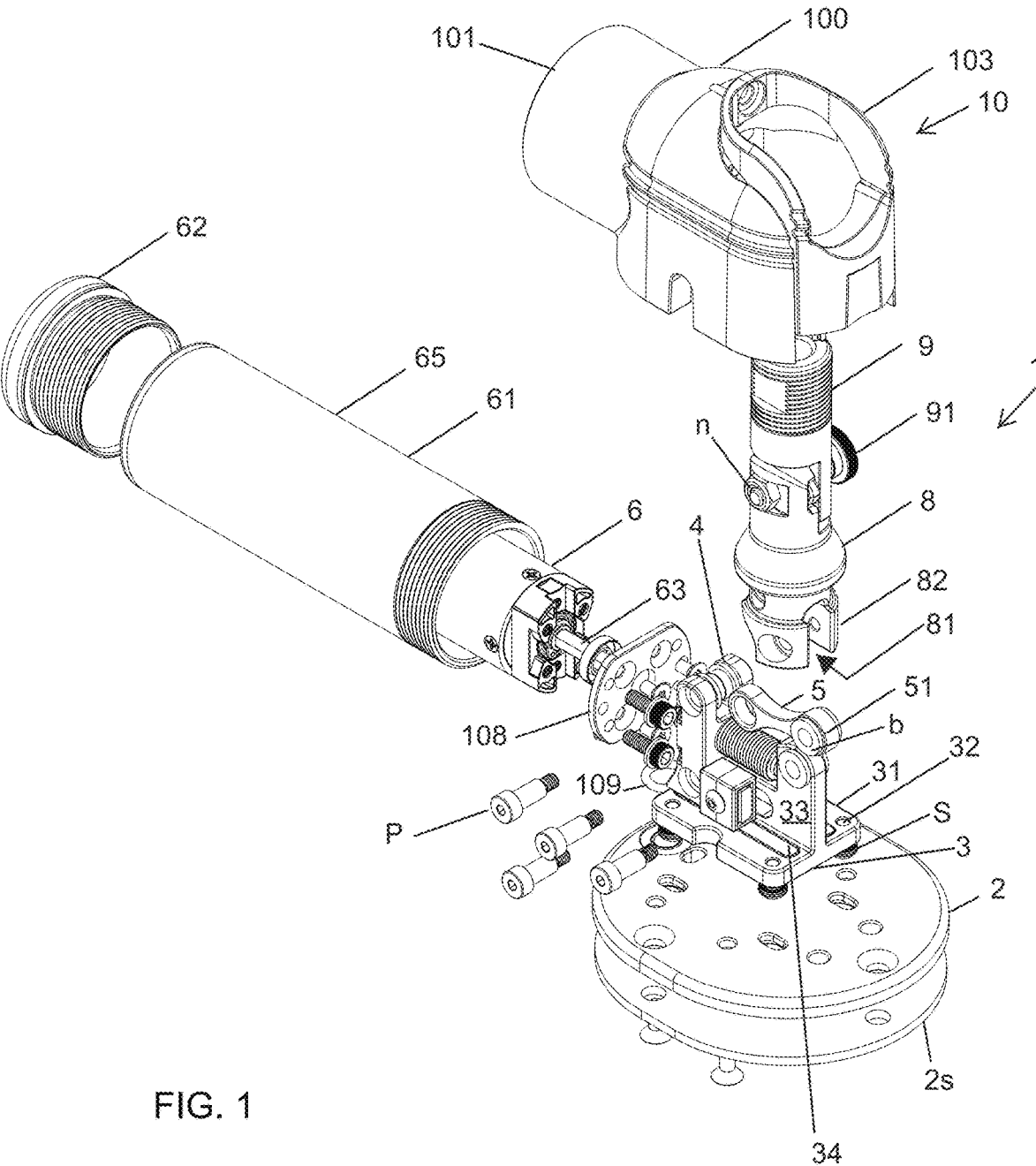
FIG. 1 is an exploded perspective view of the assembly of the mount.
Figure 1A:
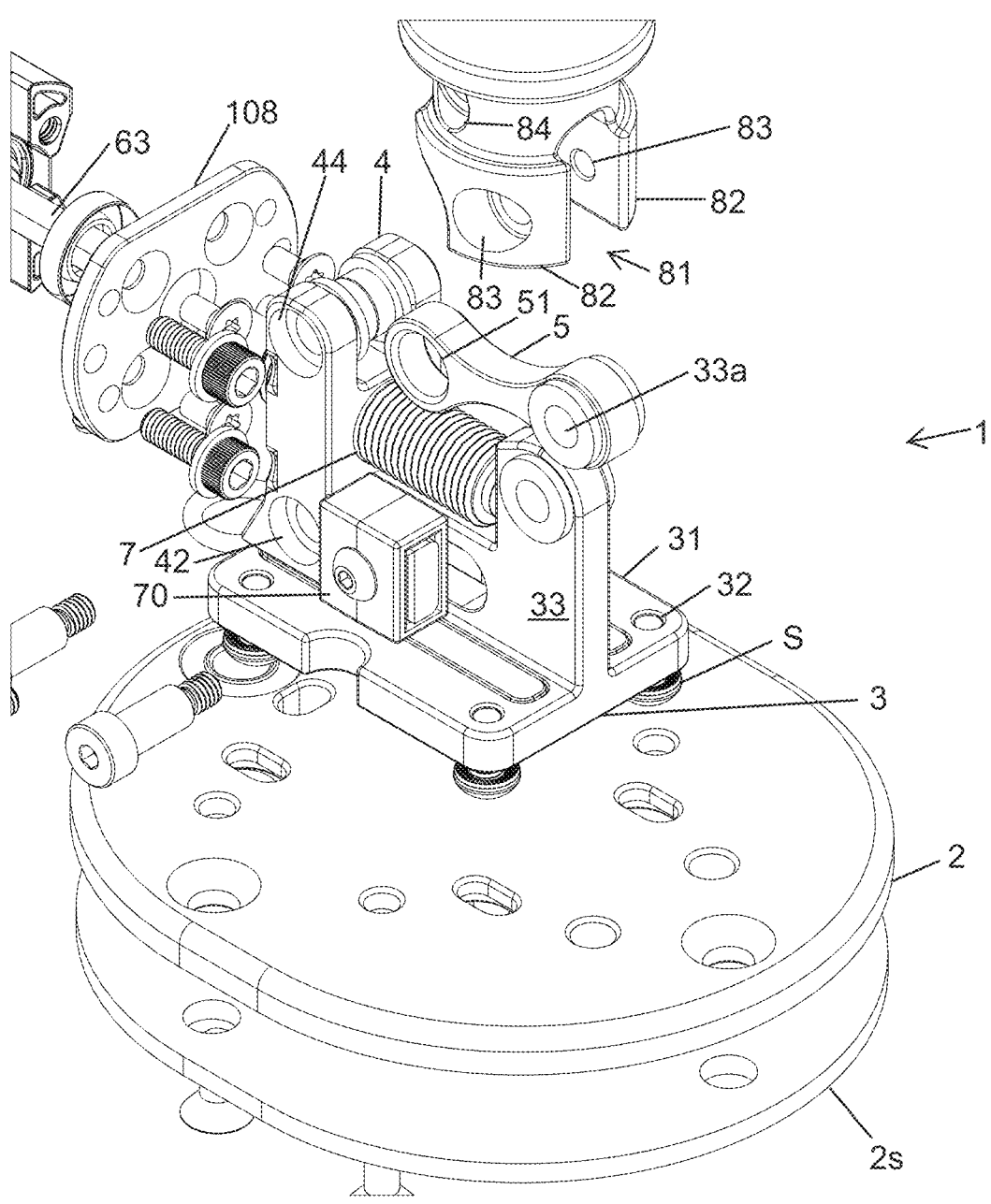
FIG. 1A is an enlarged portion of the exploded perspective view of FIG. 1.
Figure 2:
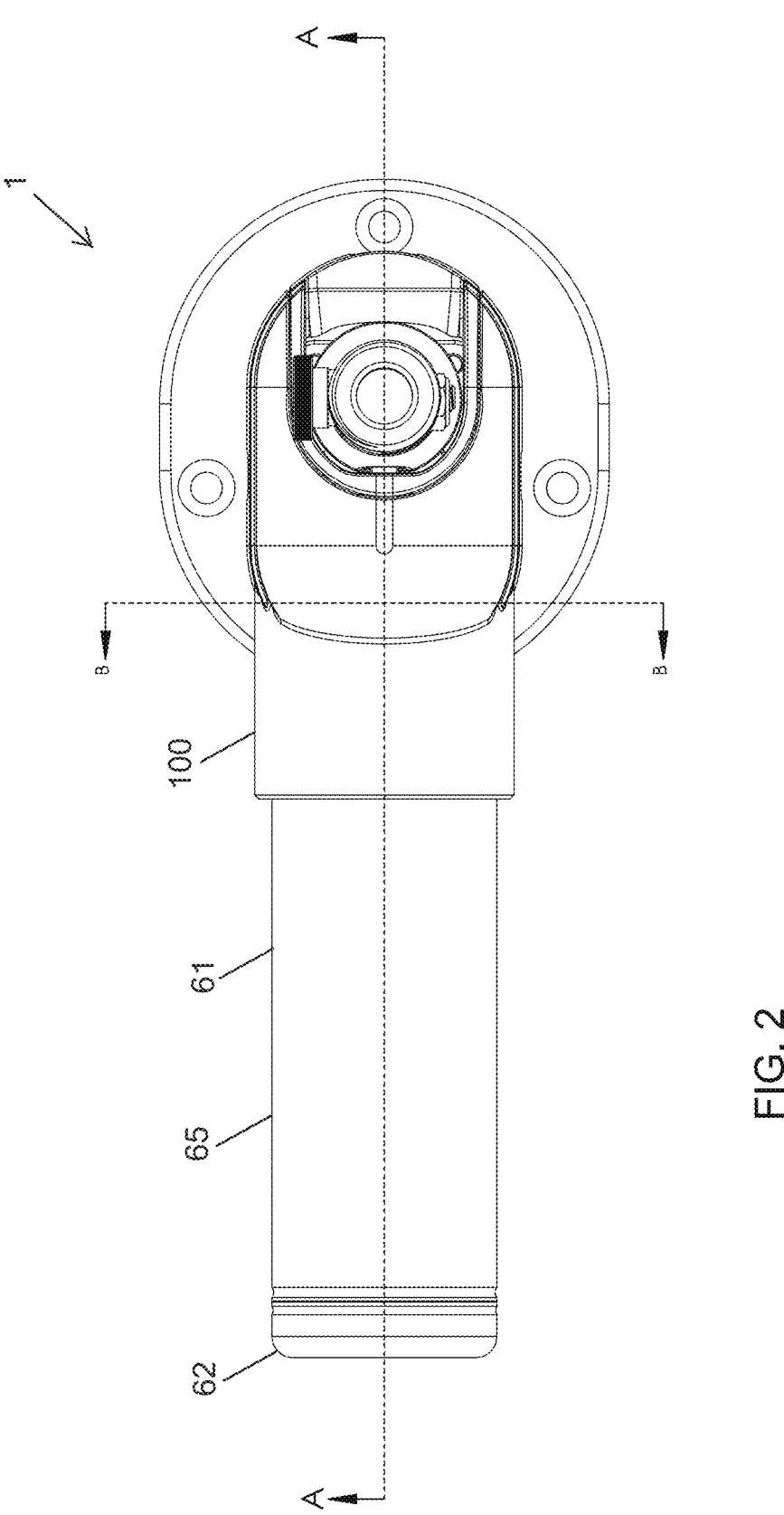
FIG. 2 is a top view of the mount.
Figure 12:
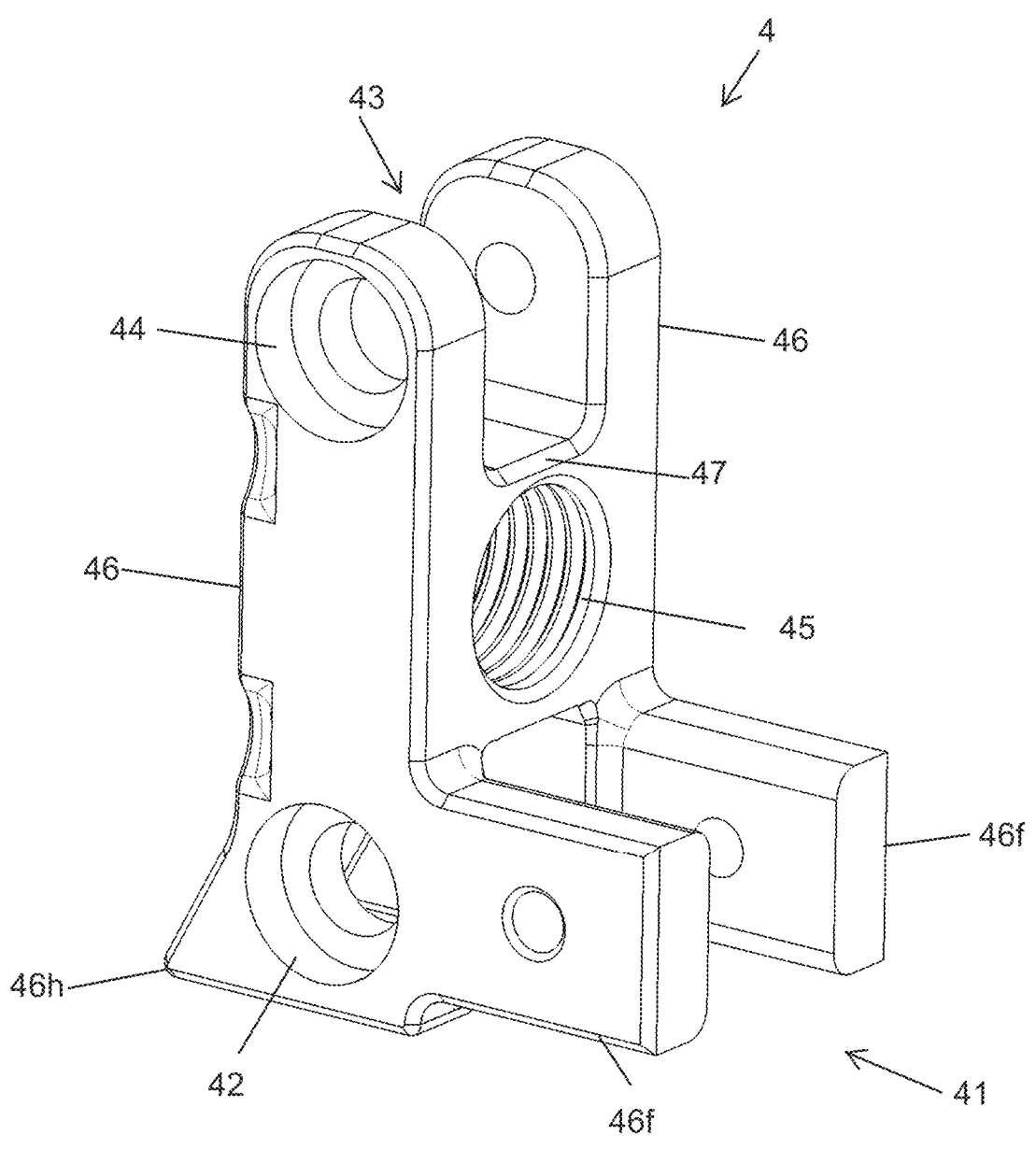
FIG. 12 is an enlarged view of a drive slide.

FIG. 1 shows an exploded assembly view of the pivotable mount assembly 1. The mount 1 has a base/mounting plate 2 that serves to affix the assembly 1 to a T-top, frame, or roof on a vessel (not shown). The base 2 may preferably be stainless steel and can have a rubber seal 2s to prevent water intrusion into the vessel structure on which it is mounted. The base 2 has a guide 3 that may be secured to the base 2 to by fasteners such as screws s. The guide 3 may have a stainless steel plate portion 31 that is disposed on the base 2 and which is engaged by the fasteners via the apertures 32. The plate 31 has a tongue 33 extending therefrom. The tongue 33 may be L-shaped and has a slot 33s formed therein. The tongue 33 is provided with an aperture 33a that serves as a pivot for a lower mount 8 that serves to support the accessory. The tongue 33 receives a drive slide 4 thereon and slides along the tongue 33. The drive slide 4 may be made of brass and, as best seen in FIG. 12, may have an H-shaped cross section defined by opposing lateral side members 46 and a cross member 47 spanning between the side members 46. The crossmember 47 is provided with a threaded through hole 45. The tongue 33 is received in a first gap 41 between the side members 46 on one side of the cross member 47. A pin p passing through the slot 33s is engaged in opposing apertures 42 in the side members 46 to secure the slide 4 to the tongue 33 and to guide the drive slide 4 along the tongue 33. In order to handle the forces generated by lifting the accessory mounted on the mounting assembly, the side members 46 may be extended at a base side thereof along the direction of travel of the slide 4. In a direction towards the pivot at aperture 33a, the side members 46 may have greater extent (i.e. forefoot) 46f greater than in a direction away from the pivot (i.e. heel) 46h. The greater extent or forefoot can have a sleeve 70 that serves as bearing surface, where the sleeves 70 are formed of a plastic bearing material such as ultra-high molecular weight polyethylene or Delrin® and can be affixed by a screw s. The plate portion 31 may include bearing strips 34 formed of a plastic bearing material such as ultra-high molecular weight polyethylene or Delrin® on which the sleeves 70 travel during the linear displacement of the slide 4 along the slot 33s. The increased footprint of the side members 46 has been found to provide a smoother linear travel of the drive slide 4.

The drive slide 4 has a second gap 43 between the side members 46 opposite the first gap 41 on a second side of the crossmember 47. The second gap 43 receives a link 5 that has apertures 51 at opposite longitudinal ends thereof. The apertures 51 may be provided with bushings b to line the apertures 51. The link 5 is inserted into the second gap 43, so that a first aperture 51 is aligned with a second pair of opposing apertures 44 in the side members 46 and a pin p is inserted through the apertures 44 and the aperture 51 to connect the drive slide 4 to the link 5. The pins p may be in the form of a screw with a shoulder that has a diameter that corresponds to the corresponding holes.

The assembly 1 includes a motor 6. The motor 6 has a stainless steel motor cover 61 with a cover endcap 62 and tube 65 to which the endcap 62 is connected. The end of the tube 65 opposite the endcap 62 is provided with a male thread to mate to a housing 10. The motor 6 has a drive shaft 63. A drive screw 7 with a male mechanical screw thread is affixed onto the drive shaft 63 of the motor 6. The drive screw 7 has a hole 7h to receive the drive shaft 63 therein. It is preferable for the hole 7h and the drive shaft 63 to have a mating non-round shape such as D-shape to rotationally fix the drive shaft 63 to the drive screw 7. In order to support a distal end of the drive screw 7 the end of the drive screw 7 opposite the drive shaft 63 is provided with a support pin 64 that is affixed onto the tongue 33 at the distal end of the drive screw 7. The hole 7h is round at the distal end to rotate on the round support pin 64. The support pin 64 can be fixed to the tongue 33 by a dowel pin 64d. The support pin 64 can have a shoulder at the tongue side. The shoulder serves as a running surface for the axial end of the drive screw 7. The drive screw 7 is threaded into the threaded through hole 45 formed in the center of the cross member 47. A rotational movement of the drive shaft 63 rotates the screw 7 and the engagement of the threads results in a linear displacement of the drive slide 4 along the tongue 33. The end of the drive screw 7 on the drive shaft 63 has a reduced diameter defining a neck 7n that has a smooth surface finish of at least $32\sqrt{}$ to serve as a sealing surface.

Figure 3:
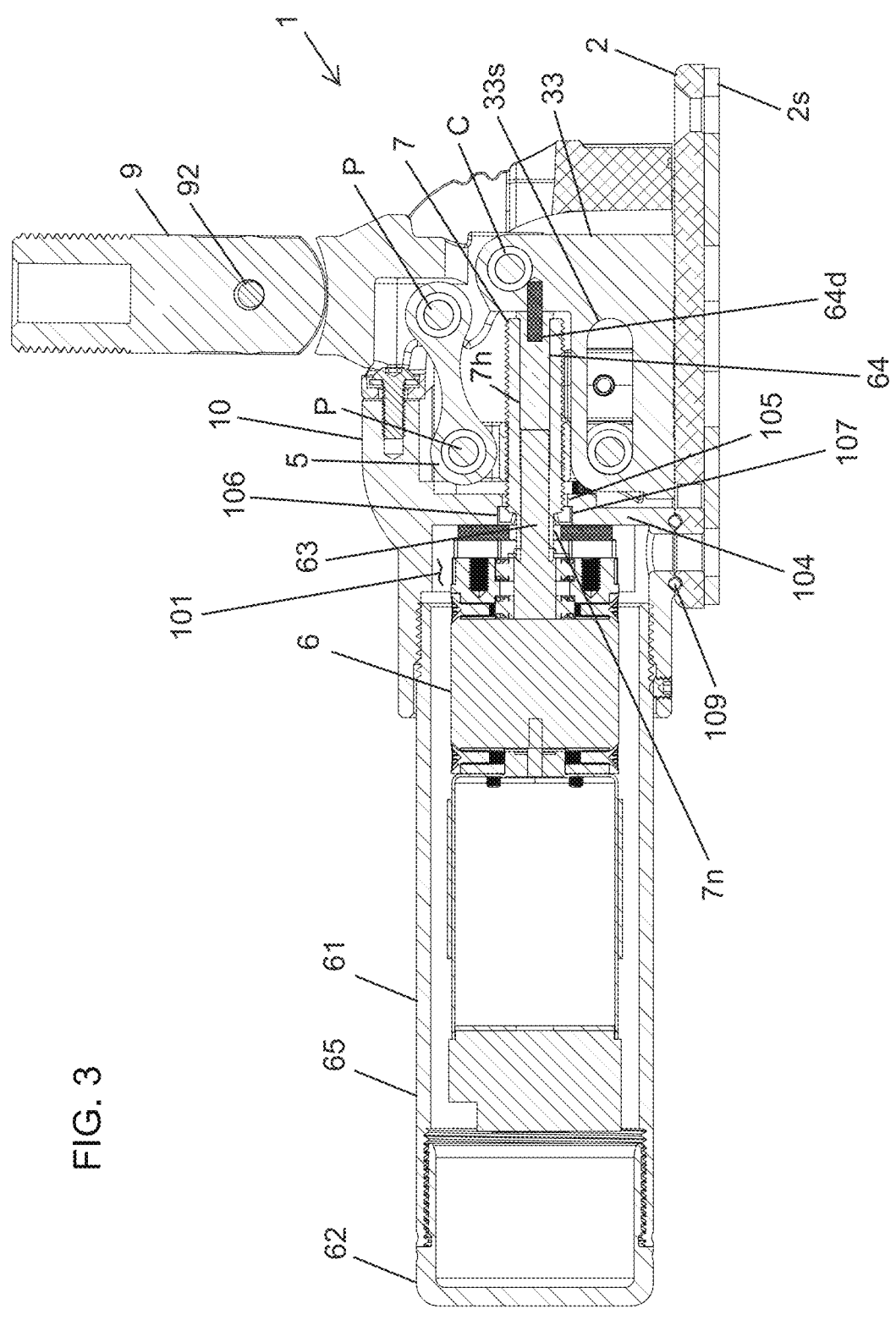
FIG. 3 is a section view of the mount taken at section line A-A of FIG. 2.
Figure 3A:
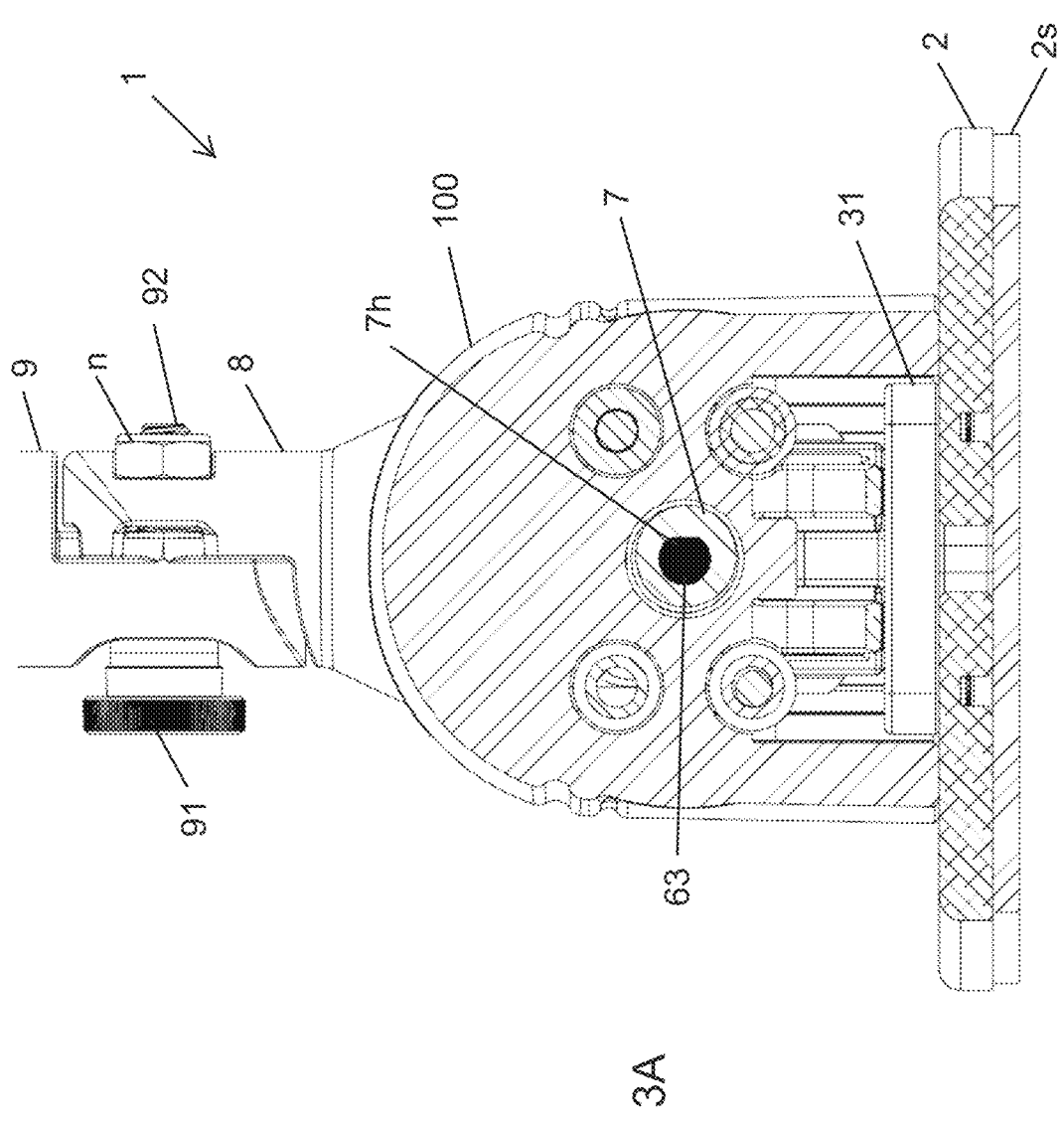
FIG. 3A is a section view of the mount taken at section line B-B of FIG. 2.

A lower mount 8 is provided to carry the antenna or accessory and pivot the antenna or accessory as desired. The lower mount 8 has a slot 81 defined by legs 82. The legs 82 each have an aperture 83 that aligns with the aperture 33a when the extension portion of the tongue 33 is inserted in the slot 81. A connector c is inserted through the apertures 83 and the aperture 33a and allows the pivoting motion of the mount 8 on the tongue 33. The mount 8 has a further aperture 84 that accepts a pin p which connects to the link 5 via a second aperture 51 opposite the first aperture 51. This connection allows the link 5 to pivot the mount 8 according to the rotation of the screw 7 and the linear displacement of the drive slide 4 along the tongue 33. An upper mount 9 that connects to the antenna or accessory is fixed to the lower mount 8 by a knob 91 with a threaded shaft 92 that accepts a nut n. The upper mount 9 has a face with a profile that engages a face of the lower mount 8 with a mating profile to allow the upper mount to index relative to the lower mount 8. This is seen in the section view of FIG. 3. When the nut n is loosened the mounts 8 and 9 are rotatable relative to one another to lower an accessory, by rotating the upper mount 9 into a position in which the upper mount 9 is parallel to the screw 7. This provides for a manual capability to lower the antenna or accessory in the event of a failure of the motor 7, the profiles re-engage with one another when indexed into the lowered position and the nut n is re-tightened. A slot may be provided in the lower mount to assist in preventing rotation of the nut n when the knob 91 is rotated.

Figure 4:
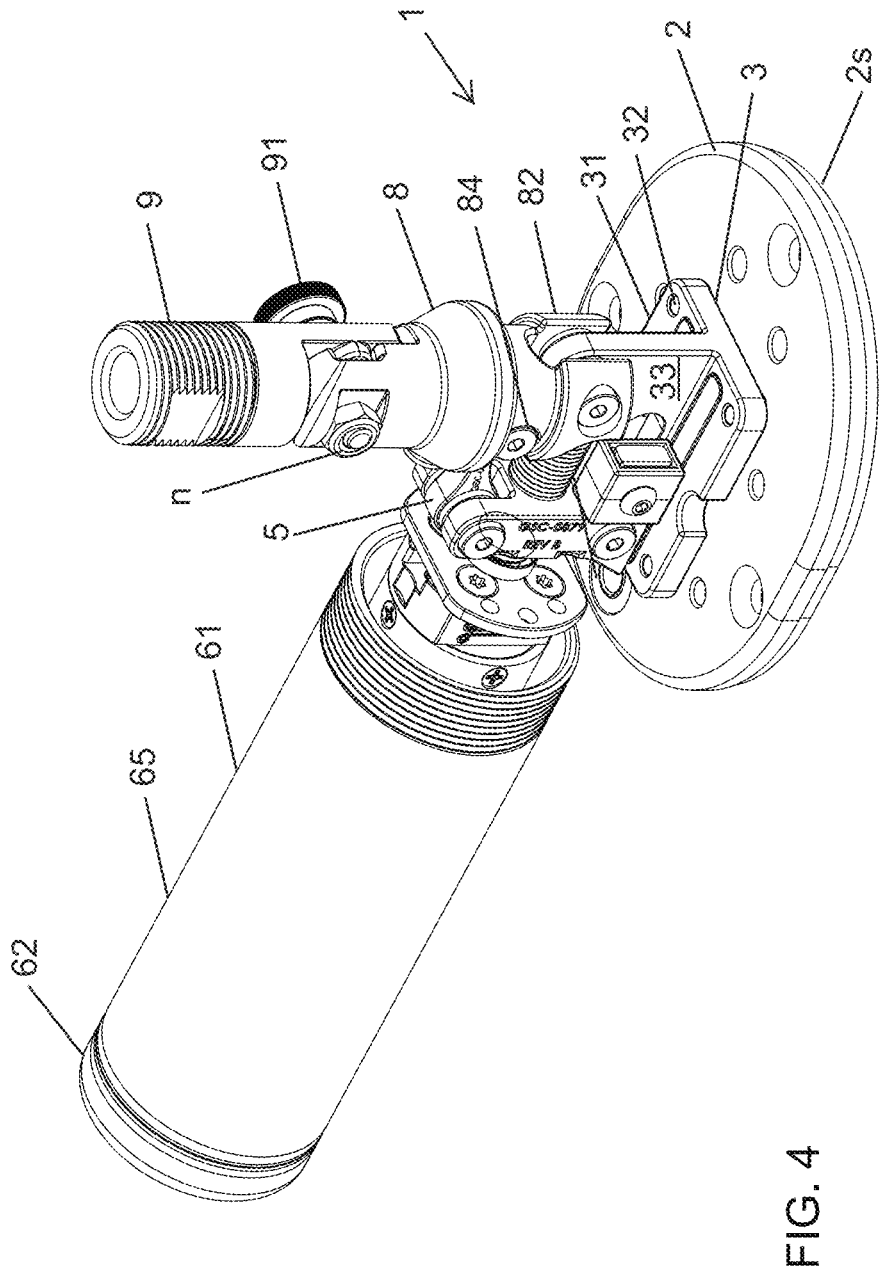
FIG. 4 is a perspective view of the mount with the outer housing omitted.
Figure 5:
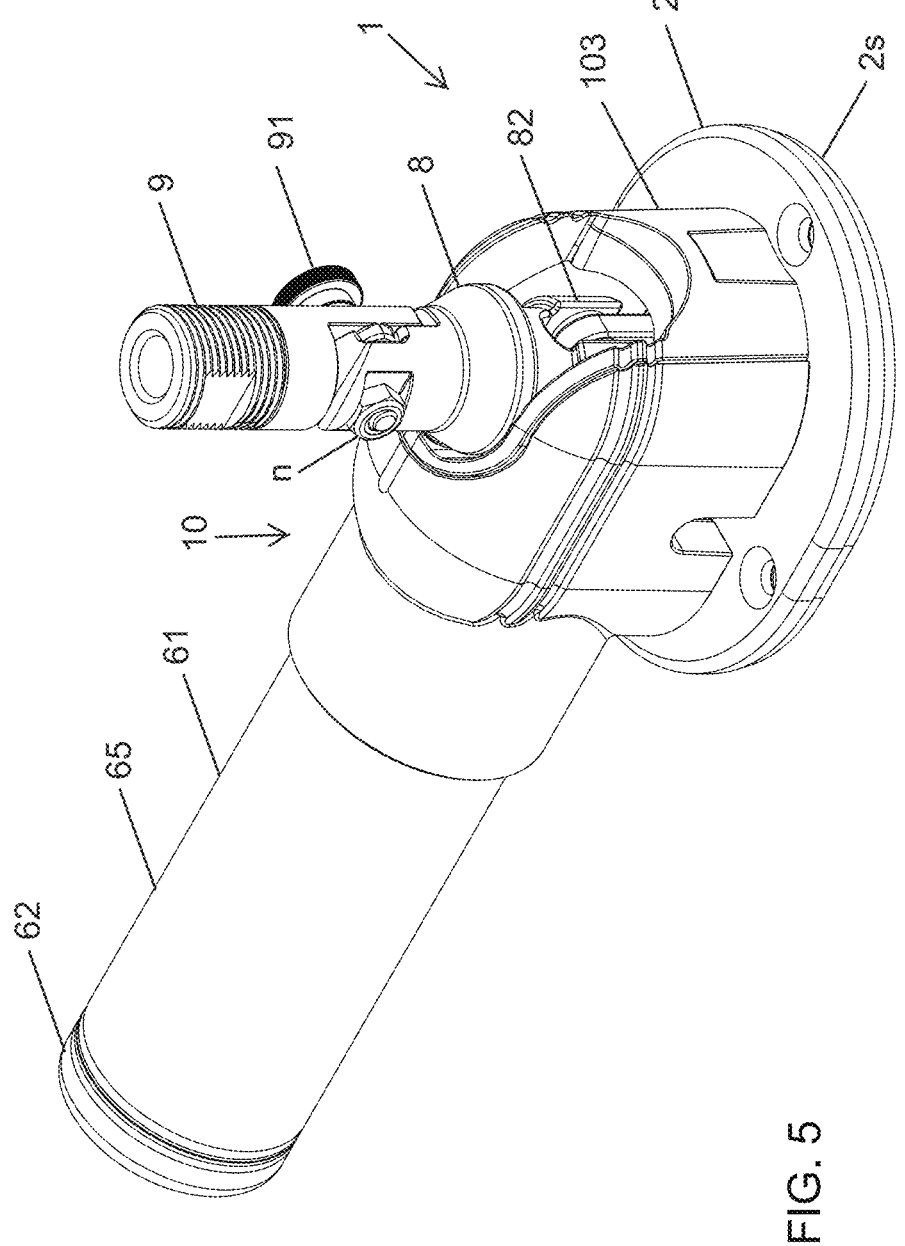
FIG. 5 is a perspective view of the mount with the outer housing in place.
Figure 6:
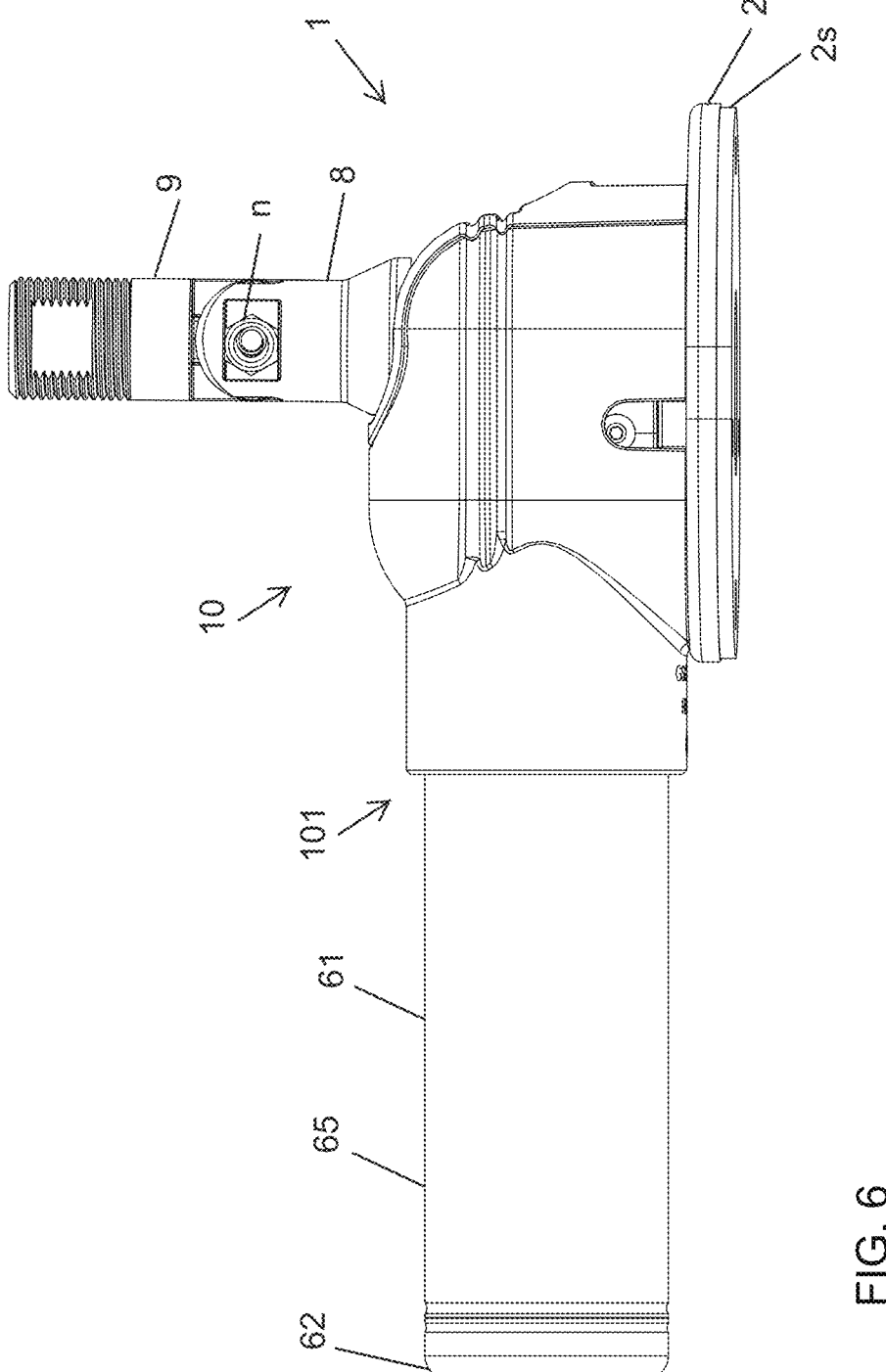
FIG. 6 is a side view of the mount.
Figure 7:
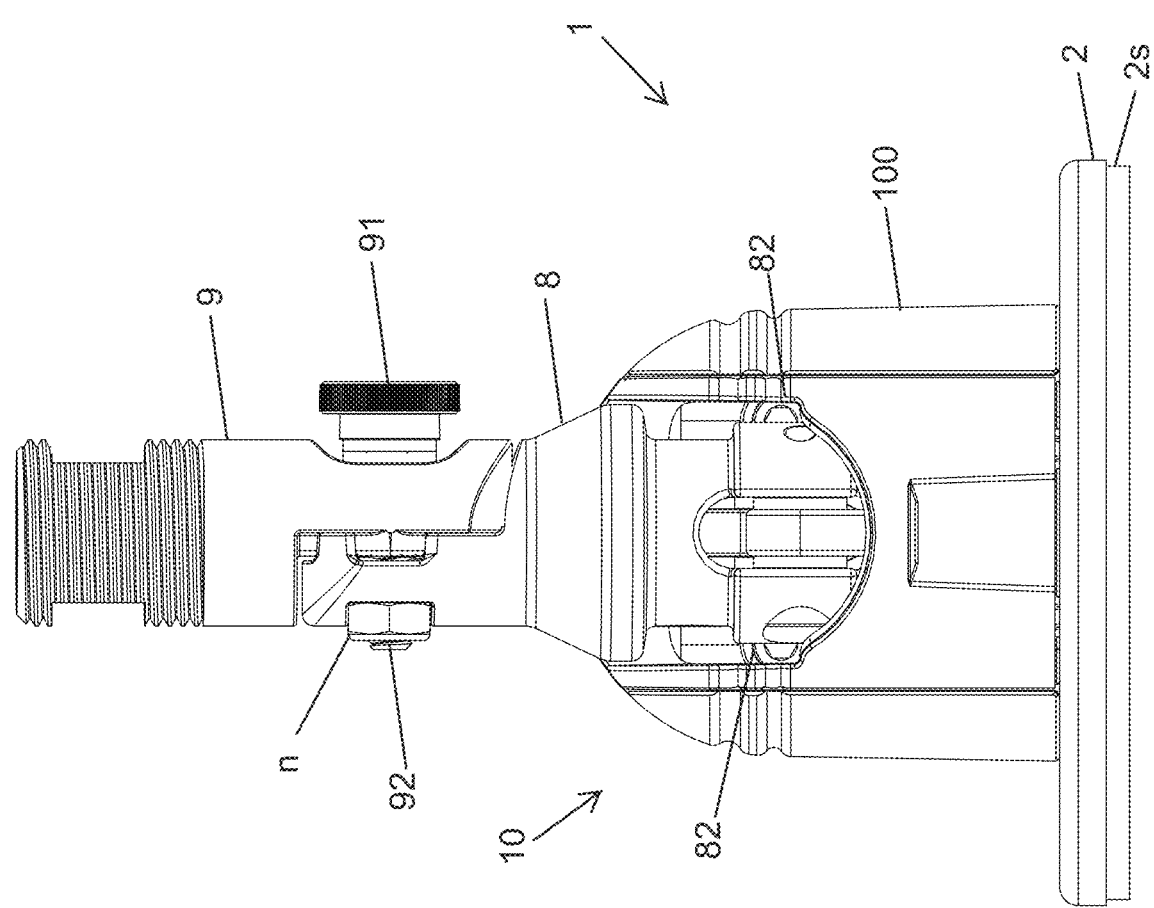
FIG. 7 is an end view of the mount.
Figure 8:
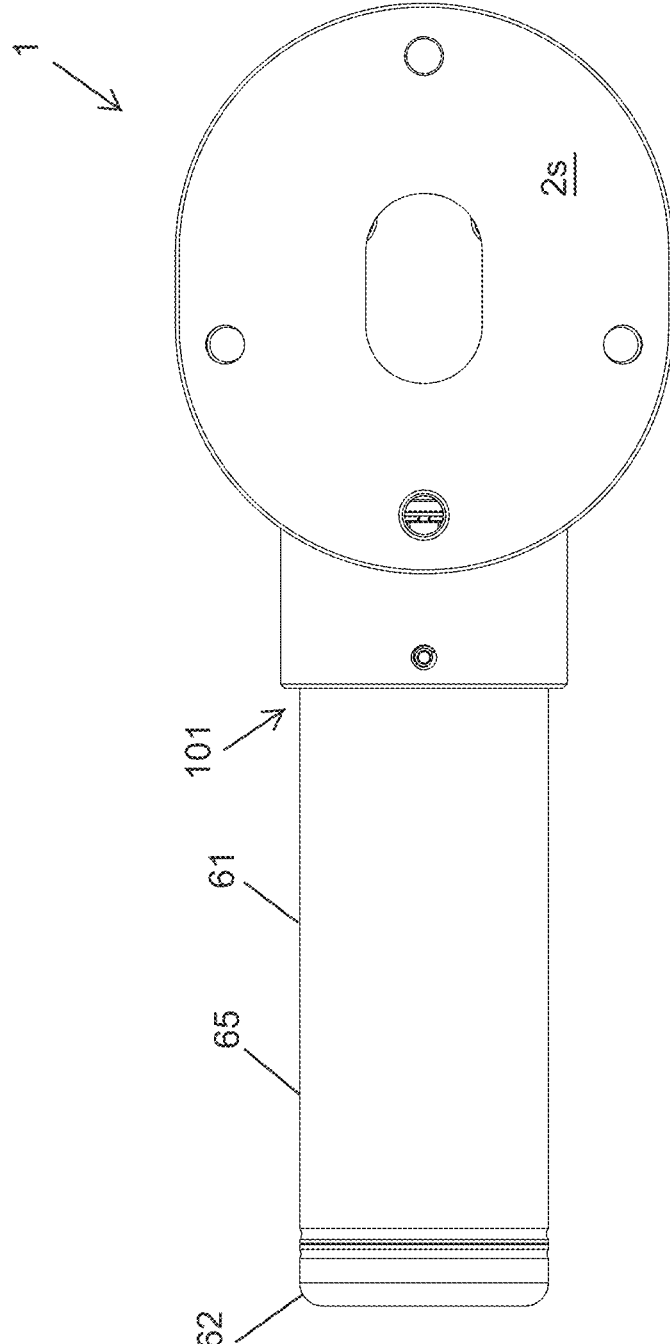
FIG. 8 is a bottom view of the mount.
Figure 9:
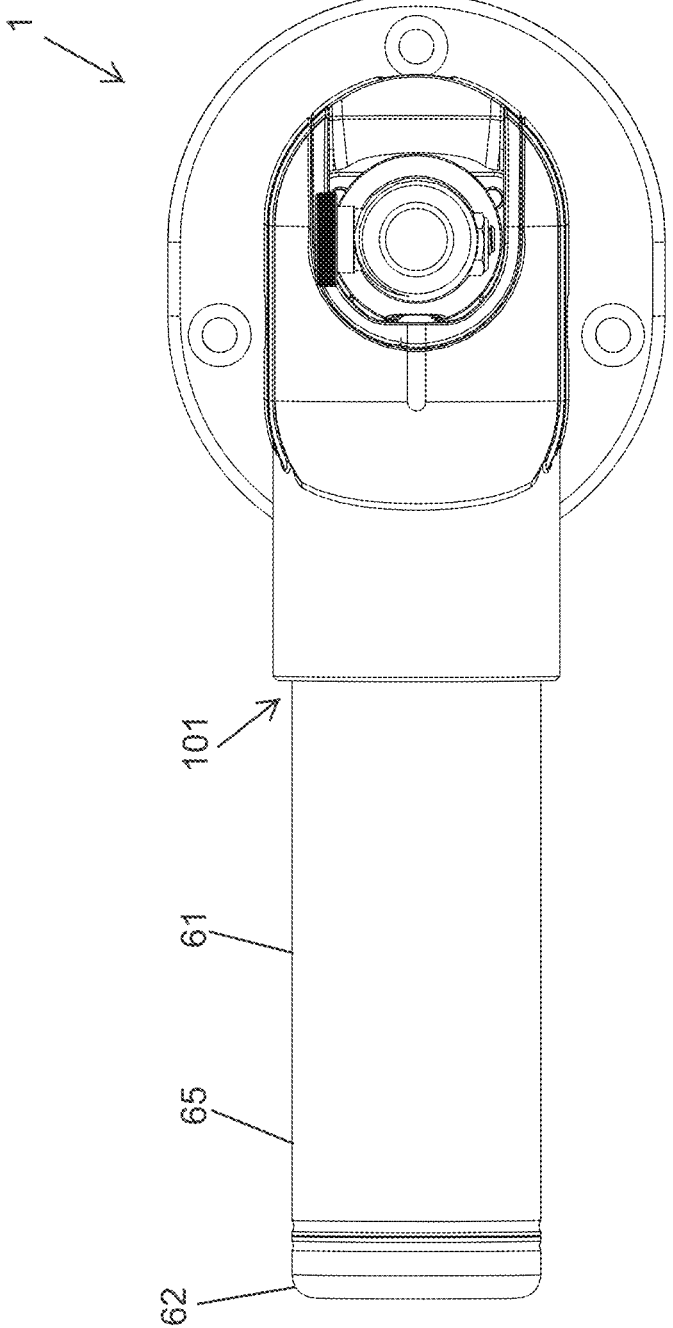
FIG. 9 is an enlarged view of FIG. 2.
Figure 10:
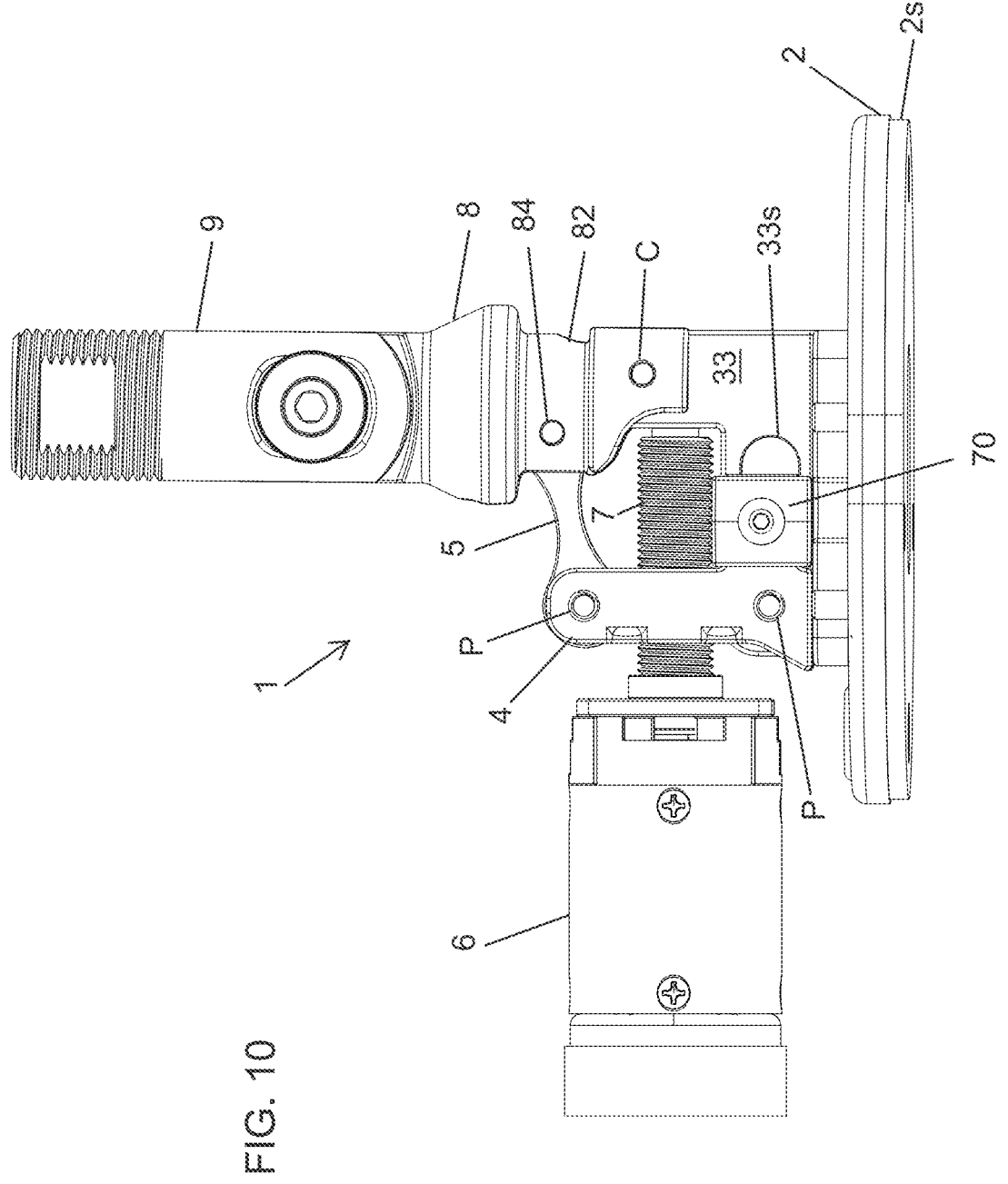
FIG. 10 is a side view of the mount showing a raised position of the antenna.
Figure 11:
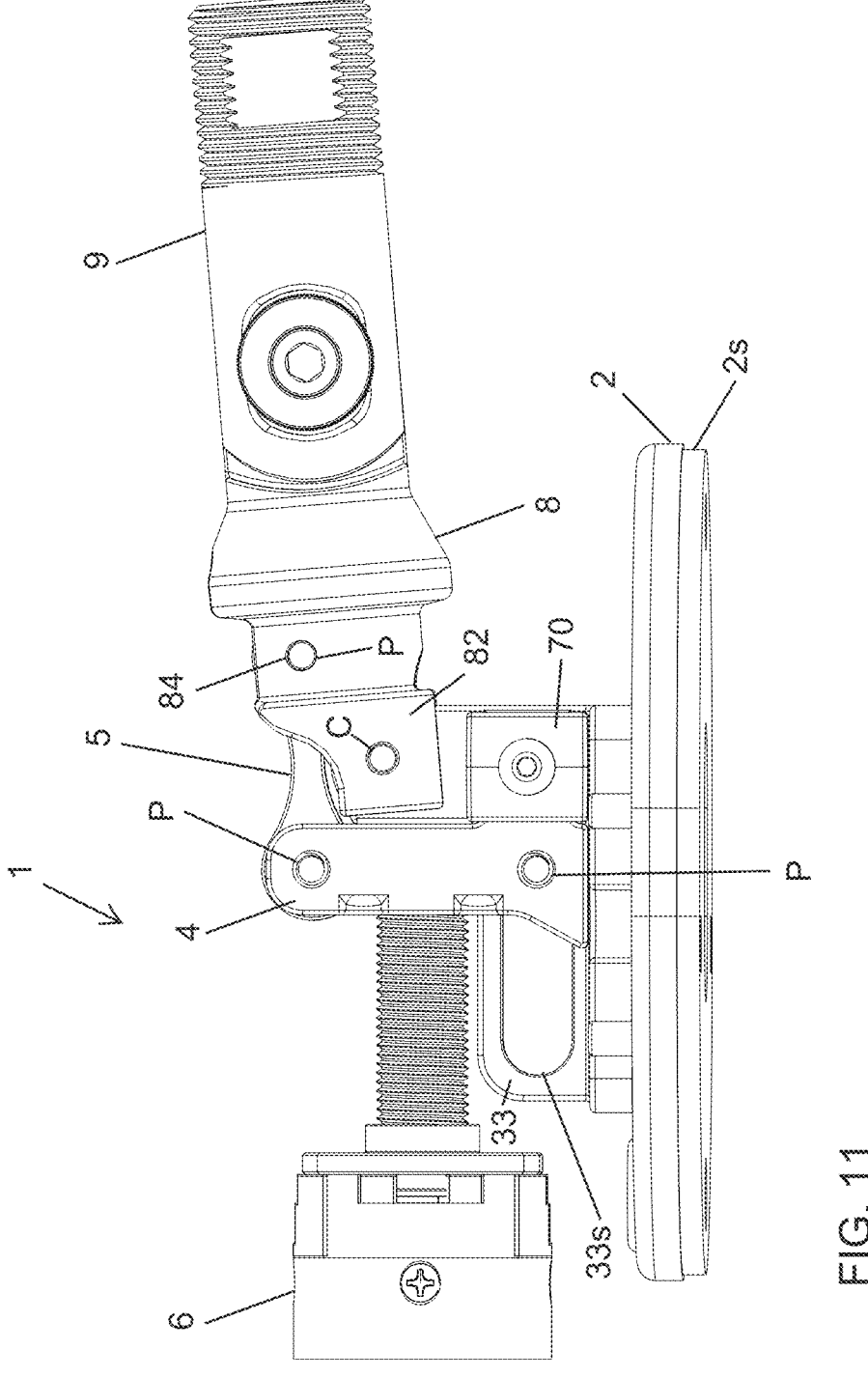
FIG. 11 is a side view of the mount showing a lowered position of the antenna.

The housing 10 is provided to cover the components of the assembly seen in FIG. 4 (without the housing present). The housing 10 has an opening 101 with a female thread that mates to the threads on the tube 65. The housing has a wall 104 at a base of the opening 101. The wall 104 has a through hole 105 with a counterbore 106 in which a seal 107 (such as: McMaster Carr Rotary Shaft Grease Seal, Part No. 515T53) is disposed. The seal 107 seals against the neck 7n of the drive screw 7 and prevents water and salt intrusion along the drive screw into the motor housing. The seal 107 is held in place by a plate 108 that abuts the wall 104. The housing 10 has a cutout 102 that accepts a plastic sleeve 103 that defines an opening where the lower mount 8 is allowed to pivot between the raised and lowered positions. The housing 10 is provided with an O-ring 109 for sealing against the plate 2 to seal a wiring passage for the motor wiring (not shown).

What is claimed is:

1. An accessory mount assembly comprising:
a drive slide;
a guide, said drive slide being connected to and linearly guided along said guide;
a link rotationally connected to said drive slide;
a drive screw engaging said drive slide for driving said drive slide; and
a mount being pivotably mounted, said mount being connected to said link for being pivoted by said link via a movement of said drive slide.

2. The accessory mount assembly according to claim 1, wherein said guide has a tongue, said mount is pivotably mounted on said tongue, said drive slide has a first gap the receives said tongue to linearly guide said drive slide, said drive slide has a second gap to receive said link.

3. The accessory mount assembly according to claim 1, further comprising a motor with a drive shaft being rotationally fixed to said drive screw for rotating said drive screw.

4. The accessory mount assembly according to claim 3, wherein said drive screw has a non-round opening and said drive shaft has a corresponding non-round profile to rotationally fix said drive shaft to said drive screw.

5. The accessory mount assembly according to claim 3, wherein said drive screw has a distal end opposite said drive shaft, said distal end has a support pin supported by said guide.

6. The accessory mount assembly according to claim 3, wherein an end of said drive screw at said drive shaft has a reduced outer diameter that defines a neck and a seal ring engages said drive screw at said neck to seal against said drive screw.

7. The accessory mount assembly according to claim 6, further comprising a housing for said drive slide, said drive screw, said link, and said guide, said housing having an opening for said drive screw to pass through, said seal ring being disposed in a counterbore at said opening.

8. The accessory mount assembly according to claim 7, further comprising a plate affixed to said housing for retaining said ring seal and for mounting said motor.

9. The accessory mount assembly according to claim 8, further comprising a tube serving as a motor housing, said tube being connected to said housing for sealing said motor from the elements.

10. The accessory mount assembly according to claim 1, wherein said drive slide has opposing side members spaced apart from one another by a crossmember, said side members each have a respective base end at a base plate of said guide, each said base end is elongated in a longitudinal direction of said drive screw to define respective extension portions.

11. The accessory mount assembly according to claim 10, comprising bearing sleeves disposed on said extension portions.

12. An accessory mount assembly comprising:
a guide with a tongue;
a drive slide linearly guided along said tongue;
a link rotationally connected to said drive slide;
a drive screw engaging said drive slide for driving said drive slide; and
a mount pivotably mounted to said guide and connected to said link for being pivoted by said link via a movement of said drive slide.

13. The accessory mount assembly according to claim 1, wherein said drive slide has opposing side members spaced apart from one another by a crossmember.

14. The accessory mount assembly according to claim 13, wherein said side members each have a respective base end for riding on said guide, each said base end being elongated in a longitudinal direction of said drive screw to define respective extension portions.

15. The accessory mount assembly according to claim 14, comprising bearing sleeves disposed on said extension portions.

16. The accessory mount assembly according to claim 14, further comprising a motor with a drive shaft being fixed to said drive screw for rotating said drive screw, said drive screw has a non-round opening and said drive shaft has a corresponding non-round profile for rotationally fixing said drive shaft to said drive screw.

17. An accessory mount assembly, for pivoting an accessory comprising:

a guide with a tongue;

a drive slide defined by two side members connected and spaced apart by a crossmember defining first and second gaps between said side members, said first gap receiving said tongue for linearly guiding said drive slide, said second gap receiving a pivoting link for pivoting the accessory.

18. The accessory mount assembly according to claim 17, comprising a drive screw engaging said drive slide for driving said drive slide along said tongue; and a mount pivotably mounted to said link for being pivoted by said link via a movement of said drive slide.

19. The accessory mount assembly according to claim 17, further comprising a motor with a drive shaft being rotationally fixed to said drive screw for rotating said drive screw, said drive screw having a non-round opening and said drive shaft having a corresponding non-round profile for rotationally fixing said drive shaft to said drive screw.

*　*　*　*　*